Nov. 29, 1955 F. S. MALICK ET AL 2,725,519

MAGNETIC AMPLIFIER ELECTRICAL POSITION CONTROL SYSTEM

Filed March 31, 1952 3 Sheets-Sheet 1

WITNESSES:
Robert C. Baird
Urban H. Faubion

INVENTORS
Franklin S. Malick &
Clarence L. Mershon.
BY
Paul E. Friedemann
ATTORNEY Nov. 29, 1955 F. S. MALICK ET AL 2,725,519

MAGNETIC AMPLIFIER ELECTRICAL POSITION CONTROL SYSTEM

Filed March 31, 1952 3 Sheets-Sheet 2

WITNESSES:
Robert C. Baird
Urban H. Faubion

INVENTORS
Franklin S. Malick &
Clarence L. Mershon
BY
Paul E. Friedemann
ATTORNEY WITNESSES:
Robert C. Baird
Urban H. Faubion INVENTORS
Franklin S. Malick &
Clarence L. Mershon.
BY
Paul E. Friedemann
ATTORNEY United States Patent Office 2,725,519
Patented Nov. 29, 1955

2,725,519

MAGNETIC AMPLIFIER ELECTRICAL POSITION CONTROL SYSTEM

Franklin S. Malick, Glen Burnie, Md., and Clarence L. Mershon, Lima, Ohio, assignors to Westinghouse Electric Corporation, East Pittsburgh, Pa., a corporation of Pennsylvania Application March 31, 1952, Serial No. 279,666

11 Claims. (Cl. 323—39)

This invention relates generally to electrical control systems and more particularly to a control system whereby the controlling quantity is determined by an error relative to a reference condition.

One object of this invention is to provide a circuit for supplying a controlling quantity of a magnitude and sense determined by an error quantity from an error detecting circuit.

An additional object of this invention is to provide an error detecting circuit and an error responsive circuit for supplying a controlling quantity only upon an error of a predetermined value, the magnitude and sense of the controlling quantity being determined by the error.

A more specific object of this invention is to provide an error detecting circuit, two triggering amplifier channels which are responsive to error current from the error detecting circuit, the amplifier channels being for the purpose of supplying a controlling quantity in a sense determined by the error.

A still more specific object of this invention is to provide an error detecting circuit, two triggering amplifier channels responsive to error current from the error detecting circuit and selectively operable in response to the sense of the error to supply the controlling quantity in the proper sense.

A further specific object of this invention is to provide two triggering amplifier channels responsive to error current from an error detecting circuit, selectively operable in accordance with the sense of the error, and with triggering points adjustable to correspond to different values of error current.

Another object of this invention is to provide a system of the character referred to which will operate properly over a wide range of temperatures.

The aforesaid objects of the invention, and other objects which will become apparent as the description proceeds, are achieved by providing an error detection circuit, such as a Wheatstone bridge, to supply any error current to the control elements of two amplifier channels which are selectively operated in accordance with the sense of the error current to give a control quantity provided the error being detected is great enough to give an error current equal to, or greater than, that value at which the amplifiers have been adjusted to operate.

For a better understanding of the invention, reference should be had to the accompanying drawings, in which.

Figure 1:
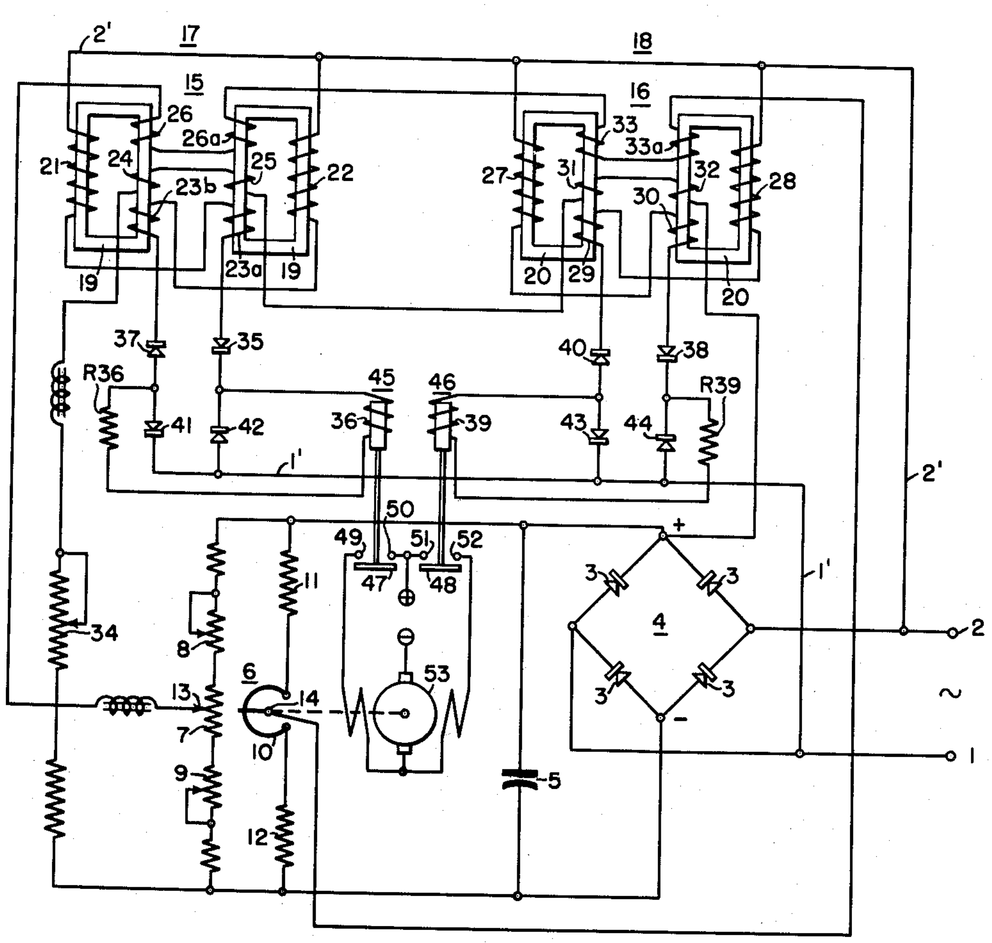
Figure 1 is a schematic diagram of control apparatus embodying the principles of this invention and having a single stage of amplification.
Figure 2:
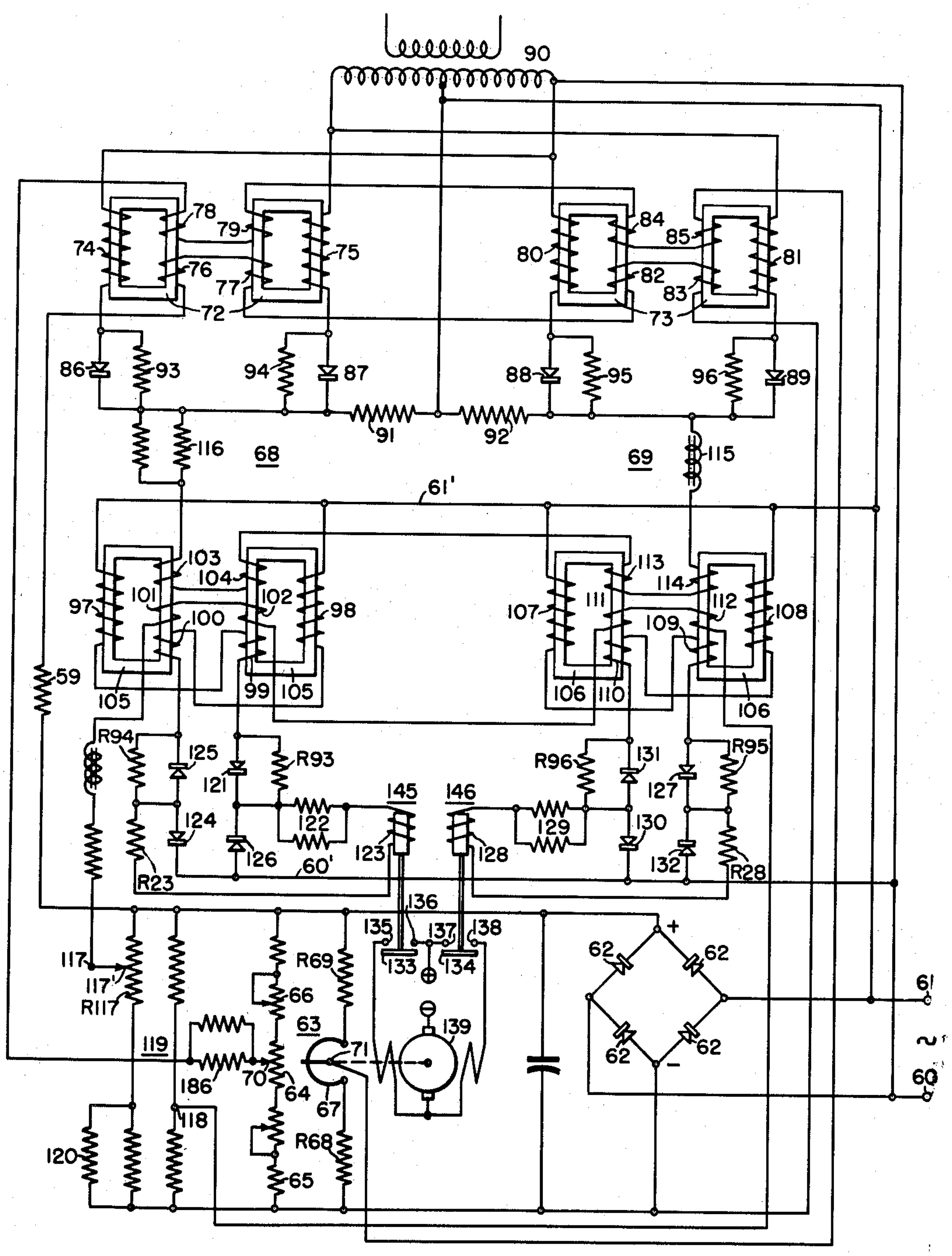
Fig. 2 is a schematic diagram of control apparatus employing this invention and including temperature compensating means and having two stages of amplification.
Figure 3:
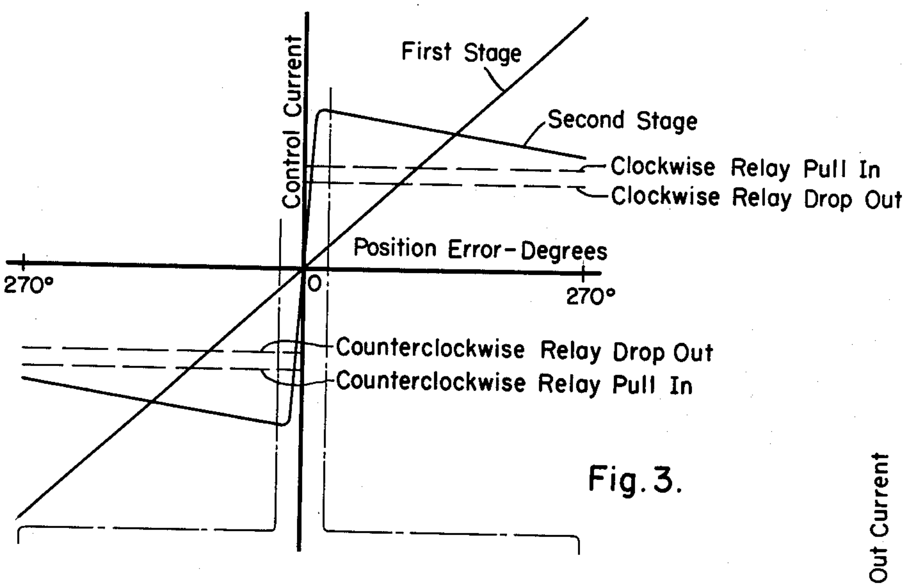

Fig. 3 shows a plot of control current as ordinate against position error in degrees where the control current is a measure of the control current to the particular amplifier in question, and position error in degrees represents the error of a controlled movement from a reference unit. The curve designated by the term "first stage" represents the characteristic of the input to each amplifier control winding in the first stage of amplification which, in the case of the circuit of Fig. 1, is the only stage, and the curve labeled "second stage" refers to the characteristics of the input to the amplifier control winding in the second stage of amplification in Fig. 2; it also represents the output current of the first stage of amplification in Fig. 2.

Figure 4:
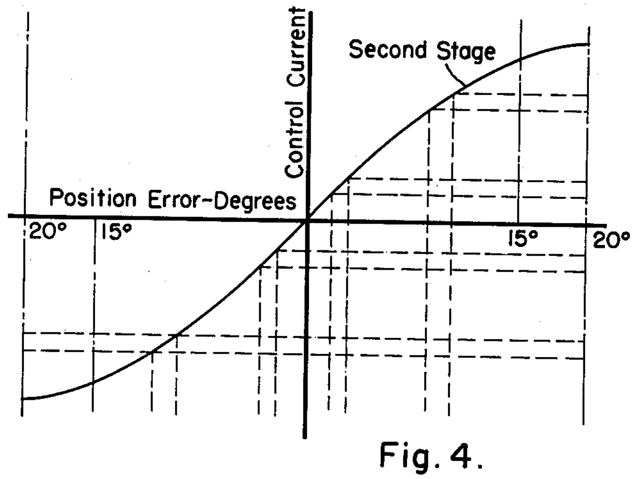
Figure 4B:
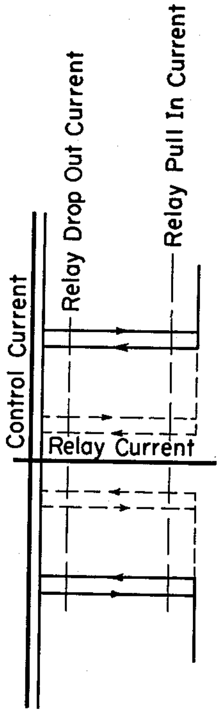
Figure 4A:
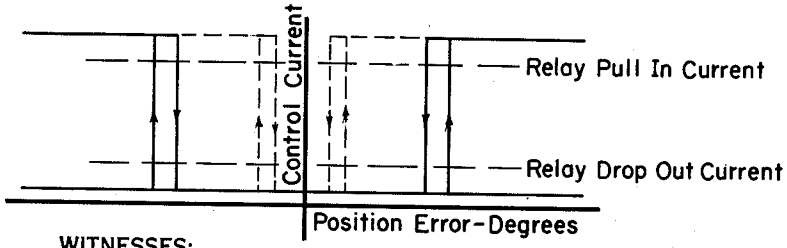

Figs. 4, 4*a* and 4*b* show further curves illustrating operating characteristics of this invention. The ordinates and abscissae of Figs. 4 and 4*a* are the same as the ordinate and abscissa in Fig. 3, except that the scale for the ordinates is very much enlarged. Fig. 4 may thus be considered an exploded view of the portion of the second-stage curve of Fig. 3, which is substantially linear. The curves of Fig. 4*a* represent the output current of the magnetic amplifiers in the output stages of both Fig. 3 and Fig. 4 for the position error in degrees of the control unit from the position of the reference unit.

The projections on Fig. 4*a* from Fig. 4 show the value of control current and magnitude and sense of position error at which the magnetic amplifiers will fire. Also on Fig. 4*a* the pull-in and drop-out values of the controlling relays are designated.

Fig. 4*b* shows the control current plotted as the ordinate against the output current of the magnetic amplifiers as abscissa. The projections on Fig. 4*b* from Fig. 4 show the value of control current for which the magnetic amplifiers in the output stages of Figs. 1 and 2 will fire and the magnitudes of the output currents of the magnetic amplifiers. Again the relay pull-in and drop-out currents are designated.

Although the principles of the invention are broadly applicable to control systems whereby the controlling quantity is determined by an error relative to a reference condition, it is illustrated in this instance as a follow-up control whereby the movements of a control unit depend upon the movements of a reference unit. More specifically, the invention as illustrated is applied to a flap control system for aircraft.

With specific reference to the form of the invention illustrated in Fig. 1, an alternating-current source is provided across the main circuit terminals 1 and 2. Rectifier 4, with the rectifiers 3 in full bridge arrangement, is provided for the purpose of supplying direct current to an error-detecting circuit. A filtering condenser 5 is applied across the output of the rectifier 4 to smooth the direct-current output. The error-detecting circuit supplied by the rectifier arrangement is shown as a Wheatstone bridge 6. The bridge is composed of a reference potentiometer 7 and calibrating resistors 8 and 9 in one bridge portion and a follow-up potentiometer 10 with limiting resistors 11 and 12 in the other bridge portion. The difference of potential between the taps 13 and 14 of the reference potentiometer 7 and follow-up potentiometer 10 determines the error quantity.

Two magnetic amplifiers 15 and 16 make up two amplifier channels 17 and 18 and have cores 19 and 20, respectively, each core being made up of a left-hand portion and a right-hand portion. The magnetic amplifier 15 in the clockwise channel 17 (so designated because it causes the tap 14 on potentiometer 10 to be rotated in a clockwise direction) is provided with main windings 21 and 22, feed-back windings **23*a* and 23*b*, biasing windings 24 and 25 and control windings 26 and 26*a***, respectively.

The magnetic amplifier 16 in the counterclockwise channel 18 is provided with main windings 27 and 28, feed-back windings 29 and 30, biasing windings 31 and 32, and control windings 33 and **33*a*. The biasing windings 24 and 25 on the magnetic amplifier 15 in the clockwise channel are wound in the same sense as the biasing windings 31 and 32 of the magnetic amplifier 16 in the counterclockwise channel 18, and they are connected to be supplied with direct current from the output of the bridge rectifier 4. A calibrating potentiometer 34 for determining the biasing current is connected in series with biasing windings 24, 25, 31 and 32. The control windings 26, 26a, 33 and 33a of each magnetic amplifier are supplied by the error quantity from the error-detecting circuit or Wheatstone bridge 6. The control windings 26, 26a, 33 and 33a for the magnetic amplifiers 15 and 16 are connected in series and are wound in opposite senses for the purpose of selectively firing the magnetic amplifiers 15 and 16** as determined by the sense of the error quantity.

The main winding 21 on the left-hand portion of core 19 of the magnetic amplifier 15 in the clockwise channel 17 is connected in a series circuit that may be traced from lead 2', considering this lead 2' to be positive for the moment, through winding 21, the feed-back winding 23a on the right-hand portion of core 19, rectifier 35 which provides the self-saturating effect for main winding 21, the actuating coil 36 of the clockwise relay 45, current limiting resistor R36, a second rectifier 41 having a function similar to rectifier 35, to the lead 1'.

The other main winding 22, on the right-hand portion of core 19, of the clockwise magnetic amplifier 15 is connected in a series circuit that may be traced from lead 1', considering this lead to be positive for the moment, through the rectifier 42 providing the self-saturating effect for winding 22, the actuating winding 36 of the relay 45, the current limiting resistor R36, the rectifier 37 having the same function as rectifier 42, the feed-back winding 23b on the left-hand portion of core 19 and main winding 22 to lead 2'.

The main winding 27 of the magnetic amplifier 16 in the counterclockwise amplifier channel 18 is connected in a series circuit that may be traced from lead 2' through the main winding 27, mounted on the left-hand portion of core 20, the feed-back winding 30 on the right-hand portion of core 20, the rectifier 38 providing the self-saturating effect for winding 27, the current limiting resistor R39, the actuating coil 39 of the counterclockwise relay 46, and rectifier 43 to the lead 1'.

The other main winding 28 of the magnetic amplifier 16 of amplifier channel 18 is in a series circuit that may be traced from the lead 1', through rectifier 44 providing the self-saturating effect for winding 28, current limiting resistor R39, actuating coil 39 of the counterclockwise relay 46, rectifier 40, feed-back winding 29 on the left-hand portion of core 20, main winding 28 on the right-hand portion of core 20, to the lead 2'.

From the foregoing it is apparent that the load for each magnetic amplifier is a winding for a relay. One winding 36 is for a clockwise relay 45 and the other winding 39 for a counterclockwise relay 46. The contacts 47 and 48 of the relays 45 and 46, respectively, bridge terminals 49 and 50 and 51 and 52, respectively, to energize a driving motor for opposite directions of rotation. The driving motor 53 is mechanically coupled to the airplane flaps (not shown) and to the tap 14 on the follow-up potentiometer 10 for the purpose of driving the flap to the correct position corresponding to the reference position of tap 13 on the reference potentiometer 7 and also driving the tap 14 on the follow-up potentiometer 10 to eliminate the error in the error-detecting circuit 6.

The diagram of Fig. 2 shows an improvement over the showing in Fig. 1. The terminals 60 and 61 are connected to a source of alternating current which supplies rectifiers 62 in full-bridge arrangement. As in Fig. 1, the rectifiers 62 supply an error-detecting circuit 63 which is a Wheatstone bridge consisting of a reference potentiometer 64 and calibrating potentiometers 65 and 66 in one bridge portion, and a follow-up potentiometer 67 with limiting resistors R68 and R69 in the other bridge portion. The difference in potential between the tap 70 on the reference potentiometer 64 and the tap 71 on the follow-up potentiometer 67 provides an error quantity. Again two amplifier channels are provided, but in the embodiment illustrated in Fig. 2, each channel has two stages of amplification, both the input and output stages comprising magnetic amplifiers. The channels are again selectively operated in accordance with the sense of the error quantity. The first channel 68 is for clockwise rotation, and the second channel 69 for counterclockwise rotation. The magnetic amplifiers in the input stage for the clockwise and counterclockwise channels 68 and 69, respectively, have cores 72 and 73. The core 72 for the amplifier in the first stage in the clockwise channel 68 is provided with main windings 74 and 75, biasing windings 76 and 77, and control windings 78 and 79. The core 73 for the amplifier in the first stage of the counterclockwise channel 69 is provided with main windings 80 and 81, biasing windings 82 and 83, and control windings 84 and 85. The control windings of each magnetic amplifier are wound in opposite senses and are supplied by the error quantity source 70, 71. A negative temperature coefficient resistor 186 is provided in series with the control windings 78 and 79 and 84 and 85 to compensate for variations in circuit resistance due to changes in temperature. The biasing windings 76 and 77 and 82 and 83 are connected in the same sense in series with each other and a current limiting resistor 59 across the rectifiers 62 in full-bridge arrangement. The main windings 74 and 75 and 80 and 81 of the magnetic amplifiers are connected in series with saturating rectifiers 86, 87, 88 and 89, respectively, and a load circuit. The main windings are supplied by a transformer 90 which is energized by the main source of alternating current 60, 61. Load resistors 91 and 92 are provided for each magnetic amplifier channel and comprise part of the aforementioned load circuit. Zero temperature coefficient resistors 93, 94, 95 and 96 are connected in shunt with the saturating rectifiers to reduce the effect of variations in rectifier leakage with variations in temperature.

The output stages of the amplifier channels are very similar to the single stage of amplification in each channel of the embodiment shown in Fig. 1 and consist of magnetic amplifiers in the clockwise channel 68 and counterclockwise channel 69.

The magnetic amplifier in the second stage of the clockwise channel 68 has main windings 97 and 98, feedback windings 99 and 100, biasing windings 101 and 102, and control windings 103 and 104 wound on core 105.

The magnetic amplifier in the second stage of the counterclockwise channel 69 has a core 106 which has main windings 107 and 108, feed-back windings 109 and 110, biasing windings 111 and 112, and control windings 113 and 114. The control windings 103 and 104 and 113 and 114 of the magnetic amplifiers are wound in opposite senses and are connected in series with an inductance 115 and negative temperature coefficient resistor 116 across the load resistors 91 and 92 and form part of the aforementioned load circuit for the amplifiers in the input stage. The complete load circuit referred to comprises load resistors 91 and 92, negative temperature coefficient resistor 116, control windings 103 and 104 and 113 and 114, and inductance 115 all in a series loop.

The biasing windings 101 and 102 and 111 and 112 of each magnetic amplifier are wound in the same sense and are supplied with a biasing voltage determined by the difference in potential between its input terminals 117 and 118 in opposite legs of a bridge circuit 119. The tap 117' is provided in the bridge circuit so the biasing voltage may be adjusted in magnitude or even reversed in sense. A negative temperature coefficient resistor 120 is provided in one leg of the biasing bridge circuit 119 to compensate for variations in copper loss in the circuit due to changes in temperature and thereby help maintain a constant biasing current. The main windings 97 and 98 and 107 and 108 of each magnetic amplifier are connected in a circuit which is connected across the alternating-current source at terminals 60, 61.

The main winding 97 on the left-hand portion of core tion would have been counterclockwise. The magnitude of the position error between the value of the position error in one sense, that at which one magnetic amplifier will fire, and the value of the position error in the opposite sense which causes the other magnetic amplifier to fire is called the null. The null can be varied by varying the magnitude of the bias current, which is accomplished by adjustment of the calibrating potentiometer 34 in the circuit of Fig. 1 and calibrating potentiometer R117 in the circuit shown in Fig. 2. The null width is adjusted so that the motor will come to a stop before the opposite magnetic amplifier firing point is reached.

The circuit shown in Fig. 2 operates in substantially the same manner except for the temperature compensation and the first added stage of amplification.

It was found that the variations in ambient temperature could cause considerable variations in null width and firing characteristics of the magnetic amplifiers. In order to correct this, the saturating rectifiers for the magnetic amplifiers were shunted with zero temperature coefficient resistors, and negative temperature coefficient resistors were added in series with the load. The zero temperature of coefficient resistors mask out the variations in leakage of the rectifiers with variations in temperature, and the negative temperature coefficient resistors compensate for variations in resistance in the series circuit due to variations in temperature. When these improvements were incorporated in the circuit of Fig. 1, it was found desirable for the accuracy of operation being sought, to add another stage of amplification. When a preamplification stage was added and the self-saturating rectifiers were shunted with zero temperature coefficient resistors, it was found that even better results were obtained by way of compensating for temperature variations than was expected. The negative temperature coefficient resistor 116 in the input to the output stage of amplification compensates for the change in resistance with temperature of the first-stage power windings and the second-stage control windings. The negative temperature coefficient resistors 122 and 129 in series with the relay windings 123 and 128 compensate for the change in resistance with temperature of the output stage power windings and the relay coils. The bias current in the second-stage amplifier determines the sensitivity of the control, and it is necessary to keep the current constant for all temperatures. Hence, a negative temperature coefficient resistor 120 is added in the biasing source to compensate for changes in bias winding resistance as well as in variations in output from the bridge.

It will be recognized that the objects of the invention have been achieved by providing a follow-up control, whereby the movements of the control unit depend upon movements of the reference unit, and this is accomplished with accuracy and dependability and is achieved for large variations in ambient temperature.

While in accordance with the patent statutes, one preferred embodiment of the invention has been illustrated and described in detail, it is to be particularly understood that the invention is not limited thereto but is applicable in other instances which will be apparent to those skilled in the art.

We claim as our invention:

1. An electrical control system comprising an error-detecting circuit; and two triggering channels, each channel having at least one magnetic amplifier, a control winding for each amplifier, the control windings deriving their energization from the error-detecting circuit in opposite senses so that the amplifiers will be selectively operated in response to the sense of the error for supplying a control quantity of a sense determined by the error, a biasing winding for each magnetic amplifier, each biasing winding being connected to a biasing source in the same sense so that the amplifiers will not supply a control quantity until the error quantity reaches a predetermined value, an amplifier load circuit, circuits for each magnetic amplifier connected across the load comprising a main winding connected in series with a saturating rectifier and the amplifier load circuit, zero temperature coefficient resistors connected in shunt relation with the saturating rectifier elements for each magnetic amplifier, and a negative temperature coefficient resistor connected in series with at least a portion of the load of each magnetic amplifier.

2. An electrical control system comprising an error detecting circuit; two triggering channels, each channel having at least one magnetic amplifier, a control winding for each amplifier, the control windings deriving their energization from the error detecting circuit in opposite senses so that the amplifiers will be selectively operated in response to the sense of the error for supplying a control quantity of a sense determined by the error, a biasing winding for each magnetic amplifier, each biasing winding being connected to a biasing source in the same sense so that the amplifiers will not supply a control quantity until the error quantity reaches a predetermined value, circuits for each magnetic amplifier connected across the load comprising a main winding connected in series with a saturating rectifier and the amplifier load, zero temperature coefficient resistors connected in shunt relation with the rectifier elements for each magnetic amplifier, a negative temperature coefficient resistor in series with at least a portion of the load of each magnetic amplifier; and a control means connected to receive the control quantity from the selected amplifier channel to eliminate the error.

3. An electrical control system comprising an error detecting circuit; two triggering channels, each channel having at least one magnetic amplifier, a control winding for each amplifier, the control windings deriving their energization from the error detecting circuit in opposite senses so that the amplifiers will be selectively operated in response to the sense of the error for supplying a control quantity of a sense determined by the error, a biasing winding for each magnetic amplifier, each biasing winding being connected to a biasing source in the same sense so that the amplifiers will not supply a control quantity until the error quantity reaches a predetermined value, circuits for each magnetic amplifier connected across the load comprising a main winding connected in series with a saturating rectifier and the amplifier load, zero temperature coefficient resistors connected in shunt relation with the rectifier elements for each magnetic amplifier; and a control means connected to receive the control quantity from the selected amplifier channel to eliminate the error.

4. An electrical control system comprising an error detecting circuit; two triggering channels, each channel having at least one self-saturating magnetic amplifier, a control winding for each amplifier, the control windings deriving their energization from the error detecting circuit in opposite senses so that the amplifiers will be selectively operated in response to the sense of the error for supplying a control quantity of a sense determined by the error, a biasing winding for each self-saturating magnetic amplifier, each biasing winding being connected to a biasing source in the same sense so that the amplifiers will not supply a control quantity until the error quantity reaches a predetermined value, circuits for each self-saturating magnetic amplifier connected across the load comprising a main winding connected in series with a saturating rectifier and the amplifier load, zero temperature coefficient resistors connected in shunt relation with the rectifier elements for each self-saturating magnetic amplifier, a negative temperature coefficient resistor in series with at least a portion of the load of each self-saturating magnetic amplifier; and control means connected to receive the control quantity from the selected amplifier channel to eliminate the error.

5. In an electrical control system, an error detecting circuit; and two amplifying channels connected to receive 105 is in a series circuit that may be traced from lead 61′, considering lead 61′ positive for the moment, through the main winding 97, the feed-back winding 99 on the right-hand portion of core 105, rectifier 121 connected in parallel with the resistor R93, negative temperature coefficient resistor 122 having two parallel parts, the actuating coil 123 of relay 145, the current limiting resistor R23, the rectifier 124 to the lead 60′.

The main winding 98 on the right-hand portion of core 105 is in a series circuit that may be traced from lead 60′, through rectifier 126, the resistor 122, actuating coil 123 of relay 145, current limiting resistor R23, rectifier 125 connected in parallel with the resistor R94, the feed-back winding 100 on the left-hand portion of core 105, the main winding 98, to the lead 61′.

The main winding 107 on the left-hand portion of core 106 is in a circuit that may be traced from lead 61′ through winding 107, the feed-back winding 109 on the right-hand portion of core 106, rectifier 127 in parallel with resistor R95, the current limiting resistor R28, actuating coil 128 of relay 146, the negative temperature coefficient resistor 129 comprising two portions in parallel, and rectifier 130 to lead 60′.

The main winding 108 on the right-hand portion of core 106 is in a circuit that may be traced from the lead 60′, when this lead is positive, through the rectifier 132, the current limiting resistor R28, actuating coil 128 of relay 146, the resistor 129, the rectifier 131 in parallel with resistor R96, the feed-back winding 110 on the left-hand portion of core 106, and main winding 108 to lead 61.

The resistors R93, R94, R95 and R96 have a function similar to the resistors 93, 94, 95 and 96, namely, they provide zero temperature coefficient resistors in parallel with the respective rectifiers to thus substantially completely mask out the changes in rectifier leakage with changes in temperature by causing the leakage to be large for all temperatures.

It will be noted that the circuits have been traced alternately from leads 60′ and 61′. This is, of course, in harmony with the functioning of the apparatus. The rectifiers providing the self-saturating effect for the magnetic amplifiers provide for the passage of positive pulses only through the main windings.

Each circuit for each main winding of each magnetic amplifier is polarized by the aforementioned series rectifiers in the respective circuits. The load for the clockwise and counterclockwise amplifier channels consists of the clockwise and counterclockwise relay windings 123 and 128, respectively. The actuation of either relay will cause the respective relay contacts 133 and 134 to bridge terminals 135 and 136 or 137 and 138 in the circuit of the motor 139 and cause the motor to rotate in a corresponding direction.

The motor 139 is coupled mechanically to the potentiometer tap 71 of the follow-up potentiometer 67 and the airplane flaps (not shown) to drive the flaps to a position corresponding to the position of the tap 70 on the reference potentiometer 64 and the same time drive the tap 71 on the follow-up potentiometer to correct the error.

It will be noted that the output stage for the circuit in Fig. 2 corresponds very closely to the circuit shown in Fig. 1. The feed-back windings for the magnetic amplifiers in the output stage of each circuit is provided to give the amplifiers the characteristics as illustrated by the curves shown in Figs. 4*a* and 4*b*. The curve marked "first stage" of Fig. 3 illustrates the linear characteristic of the input current to the control windings 26 and 26*a*, and 33 and 33*a* from the error-detector circuit 6 in Fig. 1 and to the control windings 78 and 79 and 84 and 85 from the error-detector circuit 63 in Fig. 2. The curve in Fig. 3 designated as "second stage" applies only to the embodiment of the invention shown in Fig. 2. The curve represents the input to the second-stage control windings 103 and 104 and 113 and 114 from the first stage of amplifiers.

Position error in degrees was used in Figs. 3, 4 and 4*a* as abscissa, and it corresponds to the position error of the airplane flaps with respect to the reference position as set by the tap on the reference potentiometer. Effectively, the error quantity, that is, the difference in potential between the taps on the reference potentiometer and the follow-up potentiometer, could have been used. For clarity's sake, the substantially linear portion of the curve labeled "second stage" of Fig. 3 is exploded in Fig. 4. This portion of the curve is all that is used for the particular application since it gives the desired result.

The projections from Fig. 4 to Fig. 4*a* indicate the condition of the magnetic amplifiers for the particular control current designated in Fig. 4. Since the projections to Figs. 4*b* and 4*a* are from a linear portion of the second-stage control current curve, they would be substantially similar to projections from a linear curve such as the control current curve for the first stage and are, therefore, indicative of the control current supplied by the magnetic amplifiers in the embodiment of the invention shown in Fig. 1. The non-linear relationship between the output current and the control current shown exists because a sufficient number of positive feed-back windings are provided in series with the main windings of the magnetic amplifiers. The pull-in point for the relays are well below the value of current the magnetic amplifier puts out when it has fired, and the drop-out point is above the value of amplifier output current when it is not fired; and since the curve of output current against position error is square, the point at which the relays pull in and drop out will be a function of the magnetic amplifier characteristics and not of the relay characteristic. The same thing is illustrated in Fig. 4*b* where the control current is plotted against relay current. The dotted curves shown in Figs. 4*b* and 4*a* illustrate the shift that can be made in amplifier characteristics by changing the bias on the biasing windings.

It is seen then that the diagram of Fig. 2 provides the same control as that shown in Fig. 1 except that compensation is provided to eliminate variations in characteristics of the control due to variations in ambient temperature and that more amplification is provided when using the apparatus shown in Fig. 2.

Even though it is believed the operation of the apparatus will be apparent from the foregoing description, a very brief review thereof with reference to Fig. 1 only will be made for the purpose of summary and simplification. If a pilot desires to move the flaps of his aircraft, he would simply move the tap 13 on the reference potentiometer 7 through a suitable control handle or other means to a position to which the airplane flaps are to conform. The Wheatstone bridge 6 thus becomes unbalanced. The unbalance across the bridge then will cause a difference in potential between the tap 13 on the reference potentiometer 7 and the tap 14 on the follow-up potentiometer 10 which will correspond to the direction of flap movement desired.

The error quantity between the tap 13 on the reference potentiometer 7 and the tap 14 on the follow-up potentiometer 10 is supplied directly across the control windings 26, 26*a*, 33 and 33*a* of the magnetic amplifiers 15 and 16 in each amplifying channel.

If the saturation of the clockwise amplifier core 19 is increased enough to allow the amplifier 15 to fire, a current will be supplied to the amplifier's clockwise relay winding 36 to energize that winding and cause the motor 53 to rotate in a clockwise direction to rebalance the Wheatstone bridge 6 and to drive the flaps to a position corresponding to the position of the reference tap 13 on the reference potentiometer 7. If the error quantity had been in the opposite sense, the other magnetic amplifier 16 would have been fired and the flap direcan error quantity supplied by the error detecting circuit, each channel having a magnetic amplifier output stage for supplying a control quantity responsive to the error quantity, the magnetic amplifiers in the output stages each having two circuits connected across the supply, each circuit consisting of a saturating rectifier in series with the main winding and the amplifier load with negative temperature coefficient resistors in series with at least a part of the amplifier load and zero temperature coefficient resistors connected in shunt relation with the saturating rectifiers, and at least one stage of amplification prior to the output stage.

6. In an electrical control system; an error detecting circuit; two amplifying channels connected to receive an error quantity supplied by the error detecting circuit, each channel having a magnetic amplifier output stage for supplying a control quantity responsive to the error quantity, the magnetic amplifiers in the output stages each having two circuits connected across the supply, each circuit consisting of a saturating rectifier in series with the main winding and the amplifier load with negative temperature coefficient resistors in series with at least a part of the amplifier load and zero temperature coefficient resistors connected in shunt relation with the saturating rectifiers, and at least one stage of amplification prior to the output stage; and a control means connected to receive the control quantity and eliminate the error in response thereto.

7. In an electrical control system, an error detecting circuit; and two amplifying channels connected to receive an error quantity supplied by the error detecting circuit, each channel having a magnetic amplifier output stage for supplying a control quantity responsive to the error quantity, the magnetic amplifiers in the output stages each having the circuits connected across the supply, each circuit consisting of a saturating rectifier in series with the main winding and the amplifier load with zero temperature coefficient resistors connected in shunt relation with the saturating rectifiers, and at least one stage of amplification prior to the output stage.

8. In an electrical control system; an error detecting circuit; two amplifying channels connected to receive an error quantity supplied by the error detecting circuit, each channel having a magnetic amplifier output stage for supplying a control quantity responsive to the error quantity, the magnetic amplifiers in the output stages each having two circuits connected across the supply, each circuit consisting of a saturating rectifier in series with the main winding and the amplifier load with zero temperature coefficient resistors connected in shunt relation with the saturating rectifiers, and at least one stage of amplification prior to the output stage; and a control means connected to receive the control quantity and eliminate the error in response thereto.

9. An electrical amplifier system comprising two selectively operable amplifier channels, a magnetic amplifier in each channel, control windings for the magnetic amplifiers connected to a control source in opposite senses, biasing windings for each magnetic amplifier connected to a biasing source in the same senses, and two circuits connected across the source and polarized in opposite senses, each of the circuits containing in series, a main winding, a feed-back winding, a saturating rectifier with a zero temperature coefficient resistor in shunt, a negative temperature coefficient resistor, the load, and a load rectifier.

10. An electrical amplifier system comprising two amplifier channels, a magnetic amplifier in each channel, control windings for each magnetic amplifier connected to a control source in opposite senses, biasing windings for each magnetic amplifier connected to a biasing source in the same sense, each magnetic amplifier having two polarized circuits connected to an alternating-current source and each circuit for a given amplifier poled in opposite relation, each circuit consisting of a main winding and a saturating rectifier connected in series with each other and in series with a load circuit, the saturating rectifier being shunted by a zero temperature coefficient resistor and a negative temperature coefficient resistor in series with at least a part of the load.

11. In combination, an error-detecting circuit, an error-responsive circuit coupled to the error-detecting circuit, and a control means responsive to the control quantity from the error-responsive circuit to remove the error, the error-responsive circuit consisting of two amplifier channels, each channel comprising a magnetic amplifier output stage and at least one stage of preamplification also consisting of magnetic amplifiers, control windings for each magnetic amplifier stage connected to a control source in opposite senses, the control source for each stage being derived from the output of the prior stage and the control source for the first stage, being the error-detecting circuit, biasing windings for the magnetic amplifiers in each stage connected to a biasing source in the same sense, each magnetic amplifier having two polarized circuits connected to an alternating current source and each circuit for a given amplifier poled in opposite relation, each circuit consisting of a main winding and a saturating rectifier connected in series with each other and in series with its amplifier load circuit, the saturating rectifier being shunted by a zero temperature coefficient resistor and a negative temperature coefficient resistor in series with at least a part of the amplifier load circuit.

References Cited in the file of this patent

UNITED STATES PATENTS

| | | |
|---|---|---|
| 2,126,790 | Logan | Aug. 16, 1938 |
| 2,229,952 | Whiteley et al. | Jan. 28, 1941 |
| 2,414,936 | Edwards et al. | May 25, 1944 |
| 2,464,639 | Fitzgerald | Mar. 15, 1949 |
| 2,518,865 | Cartallo | Aug. 15, 1950 |